United States Patent
Aaron

(10) Patent No.: US 7,409,593 B2
(45) Date of Patent: Aug. 5, 2008

(54) AUTOMATED DIAGNOSIS FOR COMPUTER NETWORKS

(75) Inventor: Jeffrey A. Aaron, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 507 days.

(21) Appl. No.: 10/611,634

(22) Filed: Jun. 30, 2003

(65) Prior Publication Data

US 2005/0015667 A1    Jan. 20, 2005

(51) Int. Cl.
*G06F 11/00* (2006.01)
(52) U.S. Cl. ........................................ 714/26
(58) Field of Classification Search ................ 714/26, 714/37, 47; 706/19, 20; 702/185
See application file for complete search history.

(56) References Cited

U.S. PATENT DOCUMENTS

| | | | | |
|---|---|---|---|---|
| 4,888,771 A | * | 12/1989 | Benignus et al. ............... | 714/26 |
| 4,967,337 A | * | 10/1990 | English et al. ................. | 700/79 |
| 4,985,857 A | * | 1/1991 | Bajpai et al. ................... | 702/184 |
| 5,117,353 A | * | 5/1992 | Stipanovich et al. .......... | 705/11 |
| 5,224,206 A | * | 6/1993 | Simoudis ........................ | 706/61 |
| 5,243,689 A | | 9/1993 | Yoshiura et al. ................ | 706/12 |
| 5,267,351 A | | 11/1993 | Reber et al. ................... | 707/104.1 |
| 5,388,259 A | | 2/1995 | Fleischman et al. ............. | 707/5 |
| 5,408,412 A | * | 4/1995 | Hogg et al. .................... | 701/33 |
| 5,444,823 A | | 8/1995 | Nguyen ........................... | 706/54 |
| 5,491,791 A | * | 2/1996 | Glowny et al. ................. | 714/37 |
| 5,586,252 A | * | 12/1996 | Barnard et al. ................. | 714/48 |
| 5,596,712 A | * | 1/1997 | Tsuyama et al. ............... | 714/26 |
| 5,640,403 A | * | 6/1997 | Ishiyama et al. ............. | 714/737 |
| 5,668,944 A | * | 9/1997 | Berry .............................. | 714/47 |
| 5,696,701 A | * | 12/1997 | Burgess et al. ................. | 714/25 |
| 5,704,036 A | * | 12/1997 | Brownmiller et al. .......... | 714/43 |
| 5,715,374 A | | 2/1998 | Heckerman et al. ........... | 706/46 |
| 5,717,835 A | | 2/1998 | Hellerstein .................... | 706/46 |
| 5,794,237 A | | 8/1998 | Gore, Jr. ......................... | 707/5 |
| 5,822,743 A | | 10/1998 | Gupta et al. .................... | 706/50 |
| 5,862,325 A | | 1/1999 | Reed et al. ..................... | 709/201 |
| 5,944,839 A | * | 8/1999 | Isenberg ......................... | 714/26 |
| 5,951,611 A | * | 9/1999 | La Pierre ....................... | 701/29 |
| 5,968,195 A | * | 10/1999 | Ishiyama ........................ | 714/727 |
| 5,977,964 A | | 11/1999 | Williams et al. .............. | 715/721 |
| 6,006,016 A | * | 12/1999 | Faigon et al. .................. | 714/48 |
| 6,026,388 A | | 2/2000 | Liddy et al. ..................... | 707/1 |
| 6,026,393 A | | 2/2000 | Gupta et al. .................... | 707/3 |

(Continued)

OTHER PUBLICATIONS

Notice of Allowance and Allowability, dated Nov. 2, 2007, in U.S. Appl. No. 10/610,807.

(Continued)

*Primary Examiner*—Robert W Beausoliel, Jr.
*Assistant Examiner*—Elmira Mehrmanesh
(74) *Attorney, Agent, or Firm*—Hope Baldauff Hartman, LLC

(57) ABSTRACT

Systems for providing automated diagnosis of problems for an electronic network include a central diagnosis engine configured to include modules that rank identified policy/configuration changes into potential causes, verify the ranked potential causes and determine whether any of the ranked potential causes is a likely cause or contributor to the problem. An estimator module is configured to calculate distances associated with the ranked potential causes such that a list of potential causes of the problem can be presented in order of likelihood. Other systems and methods are also provided.

24 Claims, 6 Drawing Sheets

U.S. PATENT DOCUMENTS

| | | | | |
|---|---|---|---|---|
| 6,052,809 | A * | 4/2000 | Bowden | 714/738 |
| 6,073,170 | A | 6/2000 | Sumita et al. | 709/218 |
| 6,098,061 | A | 8/2000 | Gotoh et al. | 706/50 |
| 6,125,458 | A * | 9/2000 | Devan et al. | 714/43 |
| 6,128,753 | A * | 10/2000 | Keeble et al. | 714/25 |
| 6,131,085 | A | 10/2000 | Rossides | 705/1 |
| 6,189,114 | B1 * | 2/2001 | Orr | 714/25 |
| 6,195,773 | B1 * | 2/2001 | Wada | 714/724 |
| 6,236,989 | B1 | 5/2001 | Mandyam et al. | 707/4 |
| 6,237,114 | B1 * | 5/2001 | Wookey et al. | 714/47 |
| 6,249,784 | B1 | 6/2001 | Macke et al. | 707/3 |
| 6,266,774 | B1 | 7/2001 | Sampath et al. | 726/24 |
| 6,321,192 | B1 | 11/2001 | Houchin et al. | 704/9 |
| 6,326,962 | B1 | 12/2001 | Szabo | 715/762 |
| 6,327,677 | B1 * | 12/2001 | Garg et al. | 714/37 |
| 6,357,017 | B1 * | 3/2002 | Bereiter et al. | 714/27 |
| 6,415,395 | B1 * | 7/2002 | Varma et al. | 714/37 |
| 6,430,558 | B1 | 8/2002 | Delano | 707/5 |
| 6,470,464 | B2 * | 10/2002 | Bertram et al. | 714/37 |
| 6,539,387 | B1 | 3/2003 | Oren et al. | 707/100 |
| 6,571,236 | B1 | 5/2003 | Ruppelt | 707/3 |
| 6,587,847 | B1 | 7/2003 | Stier et al. | 706/50 |
| 6,643,801 | B1 * | 11/2003 | Jammu et al. | 714/37 |
| 6,708,291 | B1 * | 3/2004 | Kidder | 714/39 |
| 6,738,780 | B2 | 5/2004 | Lawrence et al. | |
| 6,738,933 | B2 * | 5/2004 | Fraenkel et al. | 714/47 |
| 6,754,885 | B1 | 6/2004 | Dardinski et al. | 717/113 |
| 6,772,375 | B1 * | 8/2004 | Banga | 714/47 |
| 6,795,935 | B1 * | 9/2004 | Unkle et al. | 714/37 |
| 6,820,082 | B1 | 11/2004 | Cook et al. | 707/9 |
| 6,862,710 | B1 | 3/2005 | Marchisio | 715/501.1 |
| 6,883,120 | B1 * | 4/2005 | Banga | 714/47 |
| 6,907,545 | B2 * | 6/2005 | Ramadei et al. | 714/25 |
| 6,909,994 | B2 * | 6/2005 | Johnson et al. | 702/185 |
| 7,013,411 | B2 * | 3/2006 | Kallela et al. | 714/47 |
| 7,058,822 | B2 | 6/2006 | Edery et al. | 726/22 |
| 7,058,861 | B1 * | 6/2006 | Adams | 714/47 |
| 7,076,695 | B2 * | 7/2006 | McGee et al. | 714/47 |
| 7,080,000 | B1 | 7/2006 | Cambridge | 703/21 |
| 7,120,559 | B1 * | 10/2006 | Williams et al. | 702/185 |
| 7,133,866 | B2 | 11/2006 | Rishel et al. | 707/3 |
| 7,155,641 | B2 * | 12/2006 | Prang et al. | 714/47 |
| 7,237,266 | B2 | 6/2007 | Aaron | 726/25 |
| 7,246,265 | B2 * | 7/2007 | Vollmar et al. | 714/26 |
| 7,257,514 | B2 * | 8/2007 | Faihe | 702/183 |
| 7,257,744 | B2 * | 8/2007 | Sabet et al. | 714/56 |
| 7,284,162 | B2 * | 10/2007 | Dragnea et al. | 714/47 |
| 2002/0078403 | A1 * | 6/2002 | Gullo et al. | 714/37 |
| 2002/0083371 | A1 * | 6/2002 | Ramanathan et al. | 714/37 |
| 2002/0087408 | A1 | 7/2002 | Burnett | 705/14 |
| 2002/0091671 | A1 | 7/2002 | Prokoph | 707/1 |
| 2002/0166082 | A1 * | 11/2002 | Ramadei et al. | 714/37 |
| 2002/0169771 | A1 | 11/2002 | Melmon et al. | 707/5 |
| 2002/0180795 | A1 | 12/2002 | Wright | 345/772 |
| 2003/0065986 | A1 * | 4/2003 | Fraenkel et al. | 714/47 |
| 2003/0233438 | A1 | 12/2003 | Hutchinson et al. | 709/223 |
| 2004/0073855 | A1 * | 4/2004 | Maxwell | 714/724 |
| 2004/0103309 | A1 | 5/2004 | Tracy et al. | 713/201 |
| 2004/0107405 | A1 | 6/2004 | Schein | 715/530 |
| 2004/0193907 | A1 | 9/2004 | Patanella | 713/200 |
| 2004/0225927 | A1 * | 11/2004 | Warpenburg et al. | 714/47 |
| 2004/0250122 | A1 | 12/2004 | Newton | 713/201 |
| 2004/0267750 | A1 | 12/2004 | Aaron | 707/9 |
| 2005/0015667 | A1 | 1/2005 | Aaron | 714/25 |
| 2005/0038697 | A1 | 2/2005 | Aaron | 705/14 |
| 2005/0210331 | A1 * | 9/2005 | Connelly et al. | 714/26 |
| 2006/0248389 | A1 * | 11/2006 | Thaler et al. | 714/26 |
| 2007/0038899 | A1 * | 2/2007 | O'Brien et al. | 714/47 |
| 2007/0100892 | A1 * | 5/2007 | Kephart et al. | 707/200 |
| 2007/0271304 | A1 * | 11/2007 | Atluri | 707/200 |

OTHER PUBLICATIONS

U.S. Official Action dated May 21, 2007 in U.S. Appl. No. 10/610,807.
U.S. Official Action dated Nov. 21, 2006 in U.S. Appl. No. 10/610,807.
U.S. Official Action dated Jun. 19, 2006 in U.S. Appl. No. 10/610,807.
U.S. Official Action dated Dec. 29, 2005 in U.S. Appl. No. 10/610,807.
U.S. Official Action dated Oct. 3, 2007 in U.S. Appl. No. 10/611,630.
U.S. Official Action dated May 17, 2007 in U.S. Appl. No. 10/611,630.
U.S. Official Action dated Dec. 5, 2006 in U.S. Appl. No. 10/611,630.
U.S. Official Action dated Jun. 1, 2006 in U.S. Appl. No. 10/611,630.
U.S. Official Action dated Dec. 15, 2005 in U.S. Appl. No. 10/611,630.
Notice of Allowance and Allowability dated Apr. 5, 2007 in U.S. Appl. No. 10/611,637.
U.S. Official Action dated Aug. 24, 2006 in U.S. Appl. No. 10/611,637.
U.S. Official Action dated Mar. 29, 2006 in U.S. Appl. No. 10/611,637.
U.S. Official Action dated Dec. 21, 2005 in U.S. Appl. No. 10/611,637.
U.S. Appl. No. 11/768,055 entitled "Electronic Vulnerability and Reliability Assessment", filed on Jun. 25, 2007.
Website Article entitled, "A New Architecture for Managing Enterprise Log Data," by Adam Sah of Addamark Technologies, Inc., dated May 24, 2006. Presented at the LISA 2002: Sixteenth Systems Administration Conference, Berkeley, California: USENIX Association, 2002. pp. 1-8, and 17-26; (blank pages removed).

* cited by examiner

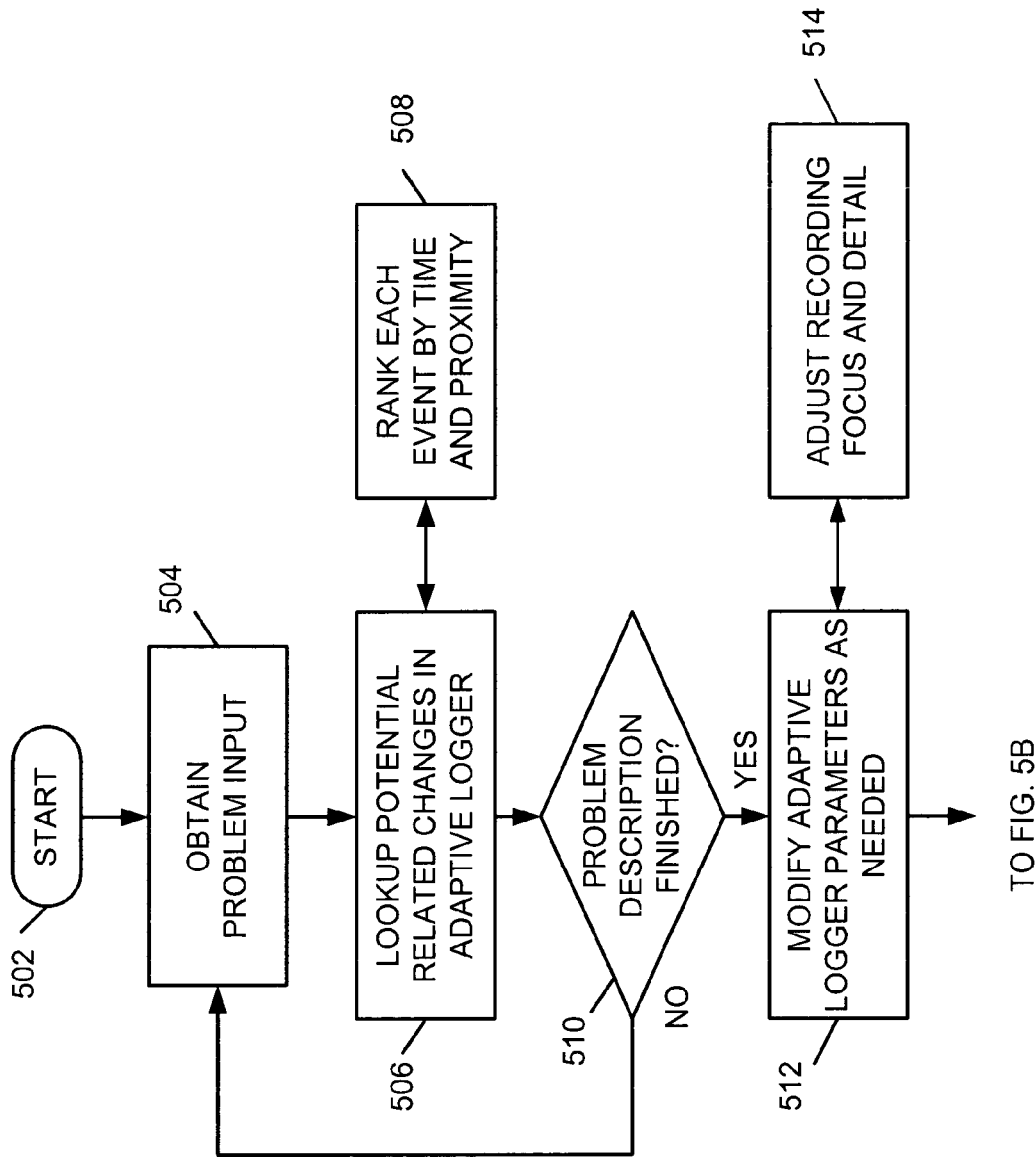

AUTOMATED DIAGNOSIS FOR COMPUTER NETWORKS

TECHNICAL FIELD

The present invention is generally related to computer systems and, more particularly, is related to providing customer support for security and management of complex networks.

BACKGROUND OF THE INVENTION

Communications networks and systems have become increasing complex. Sophisticated networks typically include a large number of elements or system components. Management of these networks often requires information and knowledge about these elements or combinations of elements such that problems can be readily resolved.

System administrators who manage these complex networks are expected provide a highly reliable and secure system. To provide a continuously high level of service, the system administrators have become problem solvers. The system administrators are often expected to respond to and understand the impact of changes to the network made by both authorized personnel and intruders, such that they can avoid or resolve problems in a timely fashion. Thus, system administrators should be knowledgeable about elements, rules, characteristics and other data related to the operation, management and control of the network. As networks continue to grow in size and complexity, it is becoming increasingly difficult for system administrators to remain informed of the operation of each element of the network using existing tools available to manage the elements. Further, the ability of system administrators to identify causes of problems is likewise diminished by the sheer complexity involved. However, having access to such information and being able to quickly identify problem causes have become pre-requisites for timely resolution of problems that arise in complex modern networks.

Thus, heretofore-unaddressed needs exist for a solution that addresses the aforementioned deficiencies and inadequacies.

SUMMARY OF THE INVENTION

Preferred embodiments of the present invention provide a system and method for automated diagnosis of security and reliability problems for electronic systems, such as profile or policy enabled systems.

Briefly described, in architecture, one embodiment of the system, among others, can be implemented to include a central diagnosis engine configured to include a rank estimator module that ranks identified changes into potential causes, a verifier module configured to verify the ranked potential causes and to determine whether any of the ranked potential causes may be an actual cause or contributor to the problem, and a distance estimator module configured to calculate distances associated with the ranked potential causes such that a list of likely potential causes of the problem can be presented. An adaptive logger is operatively coupled to the central diagnosis engine and is configured to record configuration changes made to the electronic system that fall within pre-established parameters such that a possible cause of the problem can be identified.

Preferred embodiments of the present invention can also be viewed as providing methods for the automated diagnosis of security and reliability problems for electronic profile or policy enabled systems. In this regard, one embodiment of such a method, among others, can be broadly summarized by the following steps: identifying recent configuration changes made to the electronic system that fall within pre-established parameters; ranking the identified changes into potential causes; verifying ranked potential causes to determine whether any of the ranked potential causes may be an actual cause or contributor to the problem; and calculating distances associated with the ranked potential causes to help determine the actual likelihood that one or more of them are the true cause.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 5A and 5B are flowcharts depicting functionality, in accordance with one preferred embodiment, of an example of utilizing an implementation of automated diagnosis of security and reliability problems for electronic profile or policy enabled systems.

DETAILED DESCRIPTION OF THE PREFERRED EMBODIMENTS

Disclosed herein are systems and methods for the automated diagnosis of security and reliability problems for electronic profile or policy enabled systems. To facilitate description of the inventive system, an example system that can be used to implement the automated diagnosis of security and reliability problems for electronic profile or policy enabled systems is discussed with reference to the figures. Although this system is described in detail, it will be appreciated that this system is provided for purposes of illustration only and that various modifications are feasible without departing from the inventive concept. After the example system has been described, an example of operation of the system will be provided to explain the manner in which the system can be used to provide the automated diagnosis of security and reliability problems for electronic profile or policy enabled systems.

Figure 1:
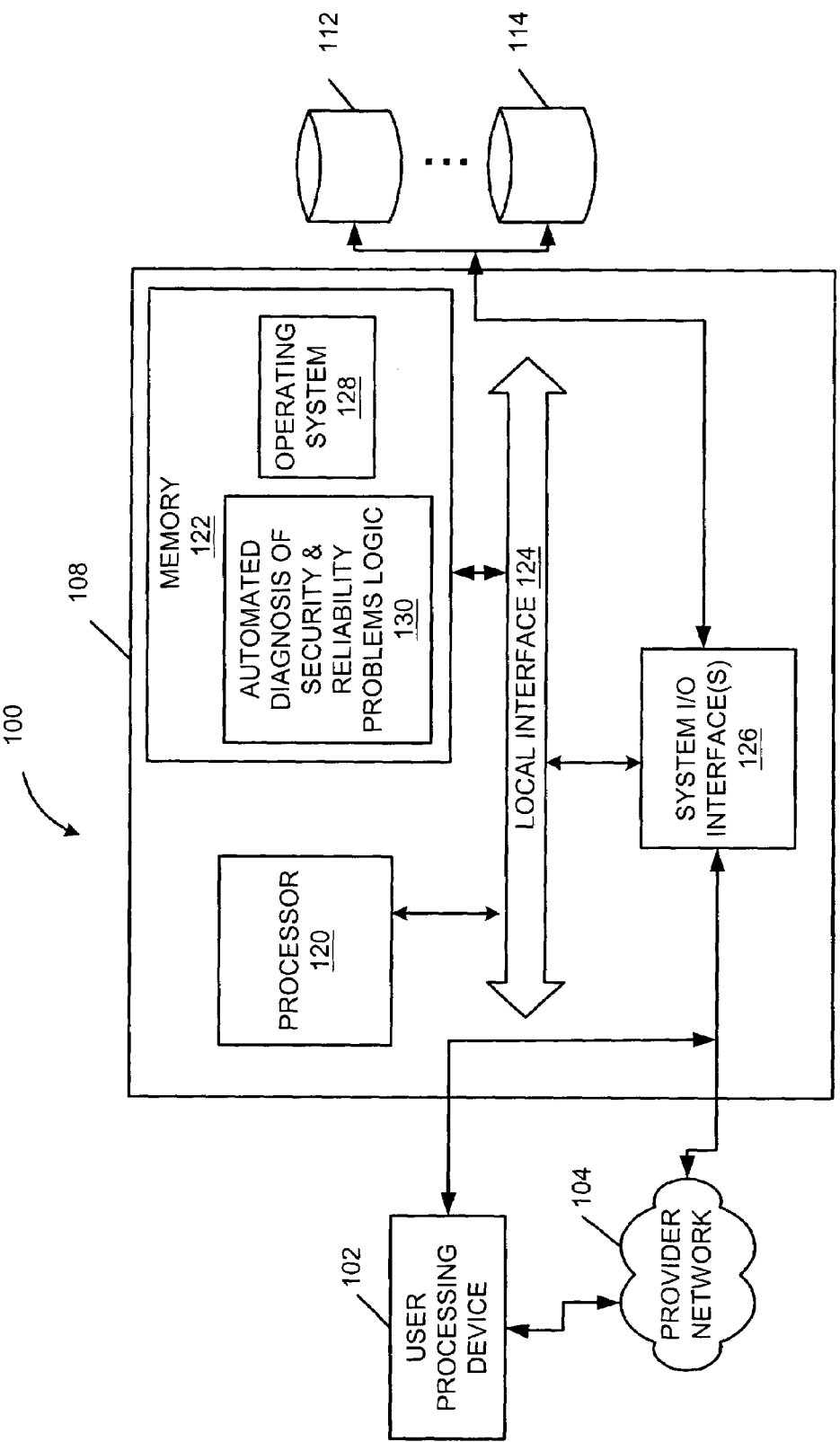
FIG. 1 is a block diagram depicting a preferred embodiment of a system for providing automated diagnosis of security and reliability problems for electronic profile or policy enabled systems.

Referring now in more detail to the drawings, in which like numerals indicate corresponding parts throughout the several views, FIG. 1 is a block diagram depicting a preferred embodiment of a system 100 for automated diagnosis of security and reliability problems for electronic profile or policy enabled systems. By way of explanation, policy refers to system configuration information. Changing the operation of the system (or a part of the system) involves modifying policy or profile information. Profiles are used to divide entities into different groups or categories to reduce the information and effort needed to manage the network or system. For example, in a network, routers might be divided into edge, intermediate and core routers (i.e., three router profiles). Each profile has a different policy definition defining membership. Within the policy for that network, different rules and configuration is delineated for each group. Thus, if a particular router is a core router, a portion of its default configuration is defined as part of a "core router" configuration and is identical to other core router, thus reducing the amount of policy information needed for the profile of core routers.

The system 100 includes a user processing device 102, a provider network 104, a computing device 108 that depicts an illustrative example of an implementation of automated diagnosis of security and reliability problems for electronic profile or policy enabled systems includes, among others, logic configured to provide automated diagnosis of security and reliability problems, and a plurality of databases 112, 114. In one preferred embodiment, information stored in databases 112, 114 is organized as field, records, or files, etc. In another preferred embodiment, the databases 112, 114 are accessible to the digital computer 108 via the a system I/O interface 126. In yet another preferred embodiment, the digital computer 108 is configured to include the databases 112, 114 in memory. In still another preferred embodiment, the databases reside on a storage server (not shown) accessible by the digital computer 108.

The provider network 104 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure. Alternatively, the user could interact directly with the computing device 108 instead of via the provider network 104 and the user processing device 102.

Generally, in terms of hardware architecture, as shown in FIG. 1, the digital computer 108 includes, inter alia, a processor 120 and memory 122. Input and/or output (I/O) devices (or peripherals) can be communicatively coupled to a local interface 124 via a system I/O interface 126, or directly connected to the local interface 124. The local interface 124 can be, for example but not limited to, one or more buses or other wired or wireless connections, as is known in the art. The local interface 124 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 120 is a hardware device for executing software, particularly that stored in memory 122. The processor 120 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 122 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 122 may incorporate electronic, magnetic, optical, and/or other types of storage media. Note that the memory 122 can have a distributed architecture, where various components are situated remote from one another, but can be accessed by the processor 120.

The software and/or firmware in memory 122 may include one or more separate programs, each of which comprises an ordered listing of executable instructions for implementing logical functions. In the example of FIG. 1, the software in the memory 122 can include automated diagnosis of security and reliability problems logic 130, and a suitable operating system (O/S) 128. The operating system essentially controls the execution of other computer programs, and provides scheduling, input-output control, file and data management, memory management, and communication control and related services.

The logic 130 is a source program, executable program (object code), script, or any other entity comprising a set of instructions to be performed. When the logic 130 is implemented as a source program, then the program needs to be translated via a compiler, assembler, interpreter, or the like, which may or may not be included within the memory 122, so as to operate properly in connection with the O/S. Furthermore, logic 130 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. The I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc. Finally, I/O 126 may couple to the provider network 104 that is configured to communicate with the user processing device 102.

When the logic 130 is implemented in software, as is shown in FIG. 1, it should be noted that logic 130 can be stored on any computer-readable medium for use by or in connection with any computer related system or method. The logic 130 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the logic 130 is implemented in hardware, the logic 130 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
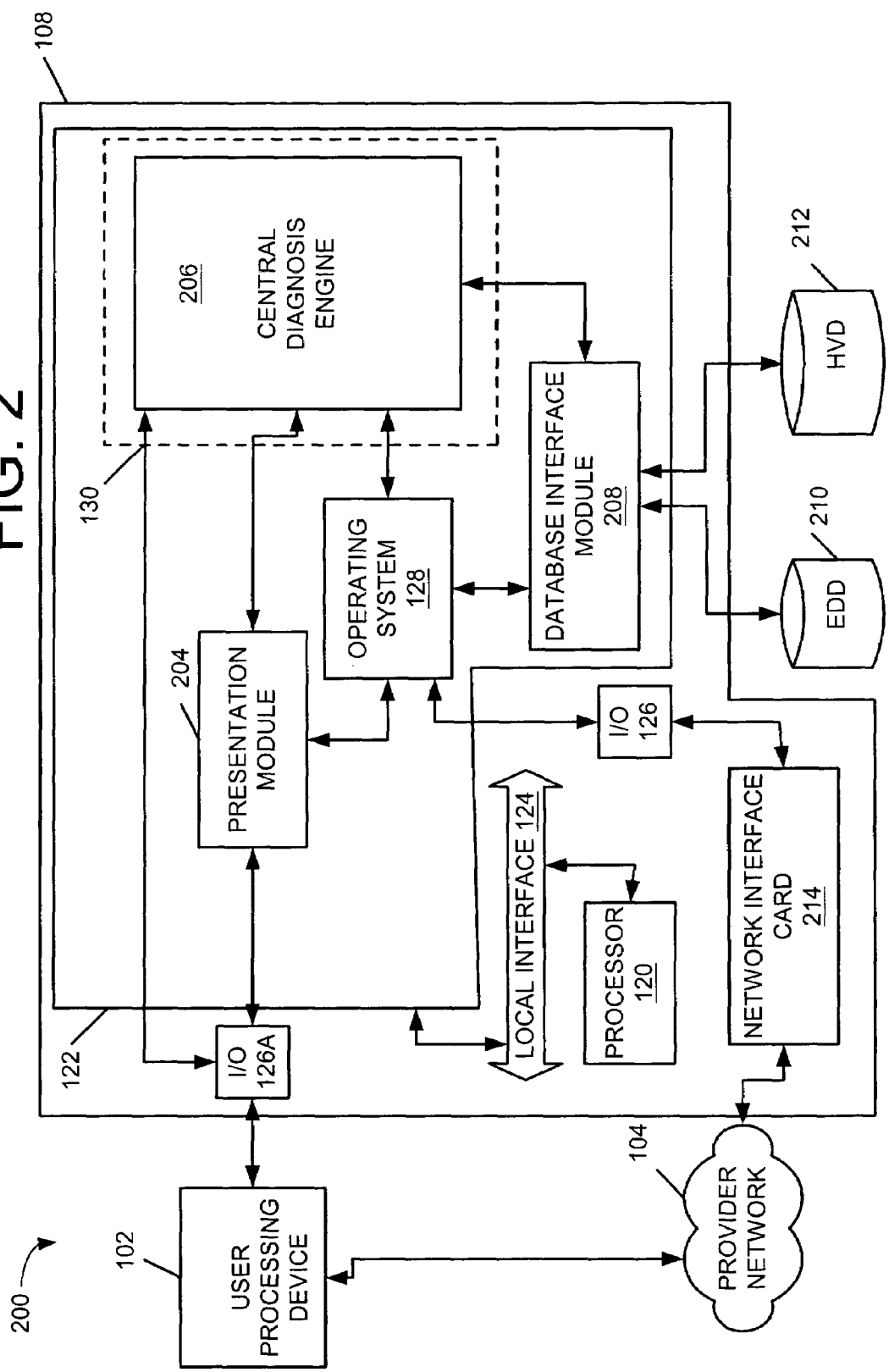
FIG. 2 is a block diagram depicting a more detailed illustrative example of a preferred embodiment of a system for providing automated diagnosis of security and reliability problems for electronic profile or policy enabled systems.

FIG. 2 is a block diagram depicting a more detailed illustrative example of a preferred embodiment of a system 200 for providing automated diagnosis of security and reliability problems for electronic profile or policy enabled systems. The system 200 includes the computing device 108 that communicates with the user processing device 102, provider network 104, and databases 112, 114 configured as an index database (EDD) 210 and a hierarchical vulnerability database (HVD) 212. The computing device 108 further includes memory 122 having operating system 128 and logic 130 configured as a central diagnosis engine 206, presentation module 204 and database interface module 208. Further, computing device 108 includes local interface 124, processor 120, network interface card 214 and system interfaces 126, 126A. In an example, the user processing device 102 communicates with the computing device 108 via the I/O 126A. In another preferred embodiment, the user processing device 102 communicates with the computing device 108 via the provider network 104. In a preferred embodiment, the network interface card 214, I/O 126, and database interface modules 208 are utilized for communicating between the provider network 104 and the databases 210, 212.

The central diagnosis engine (CDE) 206 provides an interface and algorithmic intelligence between the user processing device 102, presentation module 204 and the databases 210, 212 via the database interface module 208. In a preferred embodiment, the CDE 206 is configured to receive user input describing or relating to a security or reliability problem, to determine possible causes of the problem, and to access the databases 210, 212 to verify the result. Preferably, the CDE 206 accesses the EDD 210 for customer records and cycles through the HVD 212 starting at a general level for the element on which the problem occurred or was noted, then branching down through the levels using policy-based element-descriptive information in an attempt to verify that a lowest level database page reached contains vulnerability data that corresponds to the problem encountered. After verification and final ranking in terms of the likelihood that potential causes are actual causes, the results are accumulated and made available to the presentation module 204 and/or the user's processing device 102.

The presentation module 204 summarizes and formats the accumulated results, for instance, potential causes of a problem and associated rankings or likelihood, in an appropriate manner to be informative and useful to a user. In one preferred embodiment, the presentation module 204 utilizes software engineering to accomplish the presentation of accumulated vulnerability results to the user. For example, application programming interfaces can be utilized that are consistent with the user's operating system such as Unix, Linux, Windows, etc., with specific configurations being dependent upon the user's particular implementation.

The database interface module 208 provides standard functionality utilizing, for instance, a structured query language to enable provisioning and access of the databases, EDD 210 and HVD 212. In an alternative preferred embodiment, an additional interface, such as a provisioning interface can be provided which provides for provisioning of the databases.

In a preferred embodiment, the HVD 212 is pre-provisioned with descriptive and element data such that correct results can be achieved. Preferably, data in the HVD 212 is arranged hierarchically and includes a plurality of database pages (shown in FIG. 4) having a page index, data section and selector section. The HVD 212 is preferably organized in a database structure of HVD pages as a range of information or as a continuum into a set of discrete stages that allow for repeated input, via the sort of questions that an expert would typically ask at each stage.

For example, a top section of the HVD structure includes information necessary to answer broad or general questions and/or symptoms that would naturally occur with customer inquiries. An inquiry to a bottom section of the HVD structure results in specific helpful information that (i) answers the inquiry and/or (ii) provides specific advice for remedial action. Intermediate sections of the HVD structure are preferably pre-provisioned with information and prompting questions that leads the user from a top HVD page to the desired bottom page(s), and allows for branching to related HVD pages as needed to identify all associated helpful information.

In a preferred embodiment, the EDD 210 includes customer records and any other pertinent customer information.

Figure 3:
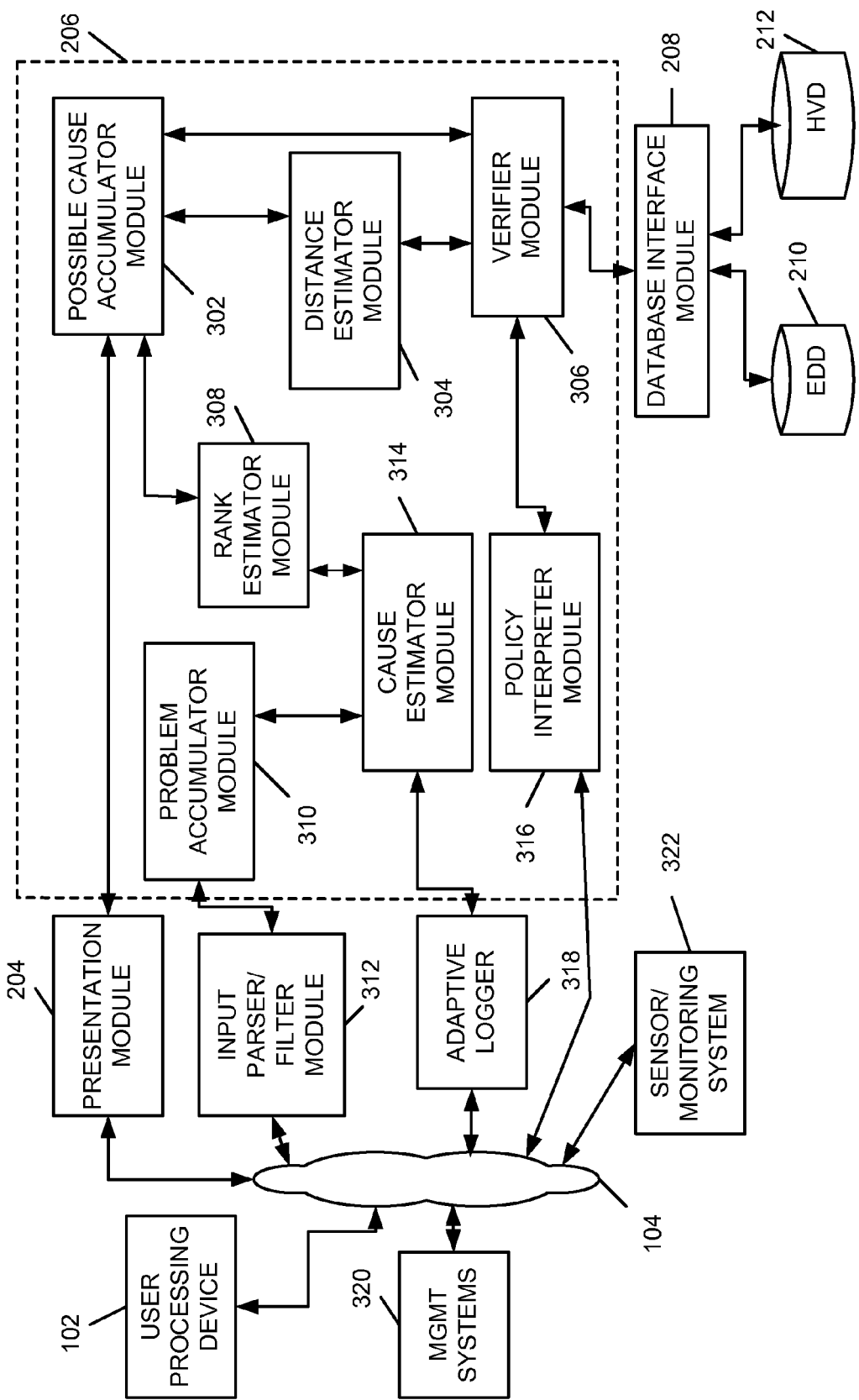
FIG. 3 is a block diagram of an illustrative example of a preferred embodiment of modules of a central diagnosis engine of a system for providing automated diagnosis of security and reliability problems for electronic profile or policy enabled systems.

FIG. 3 is a block diagram of an illustrative example of a preferred embodiment of modules of a central diagnosis engine 206 of a system for automated diagnosis of security and reliability problems for electronic profile or policy enabled systems. In a preferred embodiment, the central diagnosis engine 206 includes a possible cause accumulator module 302 that couples to the presentation module 204, distance estimator module 304, verifier module 306, and rank estimator module 308, a problem accumulator module 310 that couples to an input parser/filter module 312 and a cause estimator module 314, and a policy interpreter module 316 that couples to the verifier module 306 (and optionally to a policy-management system 320 via the network 104). The verifier module 306 is also coupled to the database interface module 208. An adaptive logger 318 couples to a policy-based management system 320 either directly or via the provider network 104.

The input parser/filter module 312 receives security or reliability problem description input from a user's processing device 102 (or an administrator) in a plurality of formats, such as data files of an acceptable format, or other input either automatically provided by monitoring, sensor or management, or manually in response to prompting from the presentation module 204, among others. In one preferred embodiment, the input parser/filter module 312 utilizes standard software engineering techniques to convert the input data into data usable by the problem accumulator module 310. The input parser/filter module 312 preferably interacts with the user's processing device 102 via application programming interfaces that are consistent with the user's operating system, for instance, Unix, Linux, windows, etc., with the details of the interfaces being dependent upon the specific implementation including the choice of software language and design. In a preferred embodiment, the implementation is selected to perform the specific conversions needed for each allowed input type. During the conversion process, the input parser/filter module 312 filters out extraneous data, such that only pertinent input remains. In an alternative embodiment, sensor and/or monitoring systems 322 from which the input parser/filter module 312 could receive security problem data includes, firewalls, security or reliability related sensors, other monitoring sensors, other monitoring devices, and intrusion detection systems (collectively referred to as IDS). IDSs in particular are typically designed to provide alarms and alerts, with associated electronic messages, when detecting security problems or attacks in progress and thus are suitable inputs to the input parser/filter module 312.

In a preferred embodiment, the problem accumulator module 310 receives problem descriptive data from the input parser/filter module 312 and cycles, continuing to receive data until the problem is fully described. The problem can be fully described, for instance, by a user finishing inputting data or the completion of the automatic transfer of information from a sensor or monitoring 322. In a preferred embodiment, the problem accumulator module 310 provides the completed set of problem descriptive data to the cause estimator module 314.

In a preferred embodiment, the cause estimator module 314 interfaces with the adaptive logger 318 to identify any changes in policy, (i.e., by which overall policy controlled system is modified), associated with the available parameters of the problem described. These parameters may include such things as the piece of equipment via which or in which the problem is noted, the system components that the problem is affecting, the time at which the problem was first noted, among others. Preferably, the cause estimator module 314 attempts to discover, via the adaptive logger 318 any policy changes which may have caused or contributed to causing the problem. Policy changes associated with system components "close to" but not directly coinciding with the problem parameters are also obtained. Subsequently, the cause estimator module 314 passes all the discovered policy changes to the rank estimator module 308, which ranks the discovered policy changes via their "closeness" to the exact problem parameters.

In a preferred embodiment, the adaptive logger 318 interfaces with a system's policy management equipment (or device, application or system) such as management system 320, such that the adaptive logger 318 can access system policy and policy changes. In a preferred embodiment, electronic links from the management system 320 provides for inputs, modifications, deletions and monitoring of a policy controlled system. An example of a policy controlled system includes a communications network that includes switches, routers, computers, sensors, monitors, interfaces, etc. that are controlled by effective use of configuration information. In an example, the adaptive logger 318 and input parser/filter module 312 are operatively coupled to the management system 320, device or other suitable component to obtain, copy or record the policy information, such as routing configurations, and changes to policy, such as logged configuration changes. The electronic links between these entities could be accomplished via any method utilizing any known standard and/or proprietary interfaces, communications networks, interconnection media, network, design, or protocol. Preferably, secure methods such as SSL, SSH, or IPsec would be utilized to provide appropriate security protection.

The adaptive logger 318 also interfaces with the cause estimator module 314. In an example, the adaptive logger 318 records, for example, log policy changes that occur, thus being termed a "logger." The adaptive logger 318 may adjust its recording in an adaptive manner by for example, modifying the focus or granularity, i.e., level of detail, in response to problem encountered. As an example, if security or reliability problems are encountered with router interface configuration, the adaptive logger 318 records greater detail than normally recorded in response to noting these problems. This provides for more effectively dealing with similar problems in the future. In a preferred embodiment, after a configurable time period, such as a week or month, the recording granularity of the adaptive logger 318 could revert to its normal setting.

In a preferred embodiment, the rank estimator module 308 receives a set of possible causes or policy changes from the cause estimator module 314 along with any associated difference in available parameters for which the rank estimator module 308 has relevant data. In an example, for the parameter of time, this would be the difference between the time each policy change occurred or is received and the exact time of the problem itself (or the time when it was noted). The differences between the time the problem occurred (or was noted by, for example, a user, an administrator, or a monitoring system or sensor system) would cause the potential causes that are closest in time to the problem occurrence to be ranked highest, i.e., designated as more likely to be the actual cause of the problem or more likely to be a contributing factor. In a preferred embodiment, the rank estimator module 308 performs ranking using a subset of available parameters for which it has parameter differences, and subsequently passes on the potential causes and associated rankings to the possible cause accumulator module 302. Preferably, the rank estimator module 308 passes the potential causes and ranking information to the possible cause accumulator module 302 one at a time.

In an example, a ranking process continuously utilizes a chosen scale (e.g., 0 to 100) for numerical simplicity and consistency. As policy changes are identified, certain parameters associated with the problem definition can be used to help rank the policy change (potential cause) in order of "closeness" to the problem. Parameters include time, equipment, sub-equipment (e.g., application residing on a particular piece of equipment), proximity, etc. Of these, the rank estimator module 308 preferably has knowledge of data and logic relating to time, equipment, and sub-equipment. In some embodiments, the rank estimator module 308 will not have proximity information since that information is preferably resident in the EDD 210 and not directly available to the rank estimator 308. Thus, the rank estimator module 308 includes information on the time of each policy change (potential cause) and the piece of equipment or sub-equipment for which that change was made. Therefore, ranking preferably utilizes each of these parameters.

In an example, regarding the time of the policy change, policy changes occurring subsequent to the problem time (such as the time the problem was noted or reported) are eliminated. Regarding equipment, sub-equipment or element or sub-element of the overall policy controlled system, policy changes occurring on the same piece of equipment as the problem are ranked highest. Further, certain types of equipment are inherently more security sensitive or reliability sensitive for certain types of problems noted, such that policy changes occurring on these types of equipment will typically be ranked higher than others for those types of problems. Other rules like these or variations of these rules can be utilized to refine the ranking process. For instance, a set of if/then rules can be used to calculate specific sensitivities (for example, "for a certain problem type, consult a list of equipment types giving their respective sensitivities on a 0 to 100 scale"). Preferably, these rules, and the quantitative sensitivities are configurable by the user or administrator. In some embodiments, default rules and sensitivities are provided.

The ranking process seeks to determine the difference between each policy change parameter and the associated problem parameter. For instance, the difference in time values between a policy change and the problem occurrence is of value in ranking. Potential causes (policy changes) closer in time to the problem (i.e., having the lowest difference) are ranked higher than others.

Regarding whether the problem occurred on the same piece of equipment as the policy change, the ranking process performed by the rank estimator module 308 determines if the policy change and problem are co-located, and if so, assigns a difference of zero (otherwise a large difference is assigned, e.g. 50). Regarding different types of equipment, type values are used with an assumed problem parameter value of 100. For example, if the policy change occurs on an element that is highly security sensitive, for example a firewall or intrusion detection system, a high type value is assigned (e.g., 75). A less security sensitive element, for example a router or Ethernet switch, is assigned a low value (e.g., 10). For equipment between these two levels of security, for instance, a server, an intermediate type value is assigned (e.g., 40). Type values can be assigned for all types of equipment and sub-equipment that reflect established security knowledge and expertise. Similar values can be assigned for reliability components. In an example, for each policy change (or potential cause) the actual parameter difference is the assumed problem parameter value of 100 minus the associated type value.

Once the difference between each policy change parameter and the problem parameter is determined, multiplicative weightings can be applied if it is desired to magnify the effects of any particular type of differences, for instance time. Subsequently, the differences (or weighted differences) are summed to calculate a combined difference over the available parameters for that policy change (potential cause). When the combined differences for each potential cause are available, the potential causes can be placed in order (ranked) from lowest difference to highest difference. This ordering reflects the potential causes from closest to the problem to farthest from the problem.

In a preferred embodiment, the possible cause accumulator module 302 receives the potential causes and ranking information from the rank accumulator module 308 (preferably one at a time) and accumulates the information until ranking is complete and all the potential causes associated with the problem are received. The possible cause accumulator module 302 interfaces with the distance estimator module 304, verifier module 306 and presentation module 204. The possible cause accumulator module 302 interfaces with the verifier module 306 to utilize the databases 210, 212 to check that the possible causes relate to the problem (as described later). The possible cause accumulator module 302 receives "distance" (i.e., the likelihood that a potential cause is the actual cause) information for each verified potential cause from the distance estimator module 304. When verification is complete the possible cause accumulator module 302 provides a list of potential causes and their distances to the presentation module 204.

In a preferred embodiment, the distance estimator module 304 calculates the distances associated with potential causes using input from the verifier module 306. The distance estimator module 304 provides the distance information for each potential cause to the possible cause accumulator module 302.

Distance and its determination are described as follows. Potential causes that are closer to the problem (i.e., having less "distance" between them and the problem) are preferably more likely to be actual causes or contributors to the problem. The final calculated distance (for each potential cause) includes the initial rankings (i.e., an initial measure of distance) adjusted appropriately by the distances determined in the verification process. Proximity information determined from the EDD 210 can be used to adjust the initial distances (rankings).

Proximity is an indication of how far away the equipment associated with the particular policy change is from the problem or equipment, system or application on which the problem was noted or occurred. For example, proximity of routers in communications networks is typically given in terms of "hops." A router connected directly to another router is one hop from that router. A router connected to a router via a router in between them is two hops from that router. A router connected to a router via two sequential routers in between them is three hops from that router, etc. A proximity indication can be easily extended. For instance, an application on a server is zero hops from that server. An application on a server connected directly to a router is one hop from that server. An application on a server connected to another server via an intervening router is two hops from the second server or any application on the second server, etc.

Preferably, information in the EDD 210 contains descriptive data for the overall policy controlled system, including data that identifies the elements that any particular element is connected to. Thus, this data can readily be used to calculate distances. As an example, the distances between elements in a communications network are readily calculated via mathematical methods used in standard routing algorithms such as open shortest path first (OSPF), as these routing algorithms typically must determine distances in order to choose potential routes between elements comprised of the lowest number of hops.

In the verification process for each policy change (potential cause), the EDD 210 data is used to calculated hop-type distances, termed "verification proximity distances," between the associated element for which the policy change was made and the element on which the problem occurred or was noted. For each verified potential cause, the original ranks (e.g., in the range of 0 to 100) can be adjusted via adding each potential cause's verification proximity distance that is normalized to a range of 0 to 100, to its original rank value, and then dividing the result by two to maintain a final range of 0 to 100. In an example, final distance values are in the range of 0 to 100, where 0 is best (i.e., most likely to be an actual cause or contributor) and 100 is worst (i.e., least likely to be an actual cause or contributor). Verified potential causes with the lowest final distances will thus have the highest final ranks, and verified potential cause with the highest final distances will have the lowest final ranks. A user/administrator will be presented with the final rank ordered list of the verified potential causes and the final distance value for each of them. In an alternative embodiment, associated descriptive information could be presented that is obtained during the verification process from the HVD 212 via accumulating descriptive material from the various levels of each verified path, for review by the user/administrator. The preferred embodiments are not limited to described distance methods and other distance, ranking measurements and calculation methods can be employed.

In a preferred embodiment, the verifier module 306 accesses the EDD 210 and HVD 212 to check each potential cause (as identified by the cause estimator module 314 and ranked by the rank estimator module 308) to determine if that potential cause is actually a cause or contributor to the problem or if it is more likely to be unrelated. The verifier module 306 also preferably provides additional ranking-related data (e.g., raw hop distance information obtained from the EDD 210) to the distance estimator module 304 so that final distances can be determined for each verified potential cause.

The verification process is described as follows. In an example, verification is performed to check that the ranked potential causes are reasonable and not just coincidental policy changes and not related to the problem described in the input process. Security and reliability vulnerabilities are determined by using the EDD 210 and HVD 212 as described in U.S. Pat. No. 7,237,266, entitled "Electronic Vulnerability and Reliability Assessment," and incorporated by this reference herein. In a preferred embodiment the HVD 212 is configured with system elements at a top level (i.e., general levels) and branches down to a multiplicity of specific security vulnerabilities at the bottom level (i.e., more specific levels). One of the main problem parameters is the element or elements in which the problem occurred or was noted, and this provides a starting point at the top level of the HVD 212 for verification. In an example, the potential causes which need to be verified, correspond to at least a partial policy configuration that provides information for the middle level of the HVD 212 which can be augmented by additional policy configuration information obtained by the policy interpreter module 316 if necessary to make progress down through the database. The problem itself is a set of symptoms or "observables" associated with one or more specific security vulnerabilities located at the bottom levels of the HVD 212.

In a preferred embodiment, the verification process is performed by the verifier module 306 utilizing the processes disclosed in U.S. Pat. No. 7,237,266, entitled "Electronic Vulnerability and Reliability Assessment," to proceed down through the HVD 212 for each potential cause. Each potential cause, together with additional policy information, if needed, provides the policy information that controls the branching downward through the levels of the HVD 212, and thus forms a path from the top level starting point to some point on a bottom level. If this path reaches a bottom most destination matching or approximately matching the identified problem, then the respective potential cause is considered verified. Otherwise, the potential cause is not verified.

In a preferred embodiment, the policy interpreter module 316 provides aspects and details of the overall system's policy for the system under review to the verifier module 306 as needed in the verification process, interfacing with the overall system's policy management capability to do so. In an alternative embodiment, the policy interpreter module 316 utilizes a complete set of policy information via the described input parser/filter input process as described in U.S. Pat. No. 7,237,266, entitled "Electronic Vulnerability and Reliability Assessment."

Figure 4:
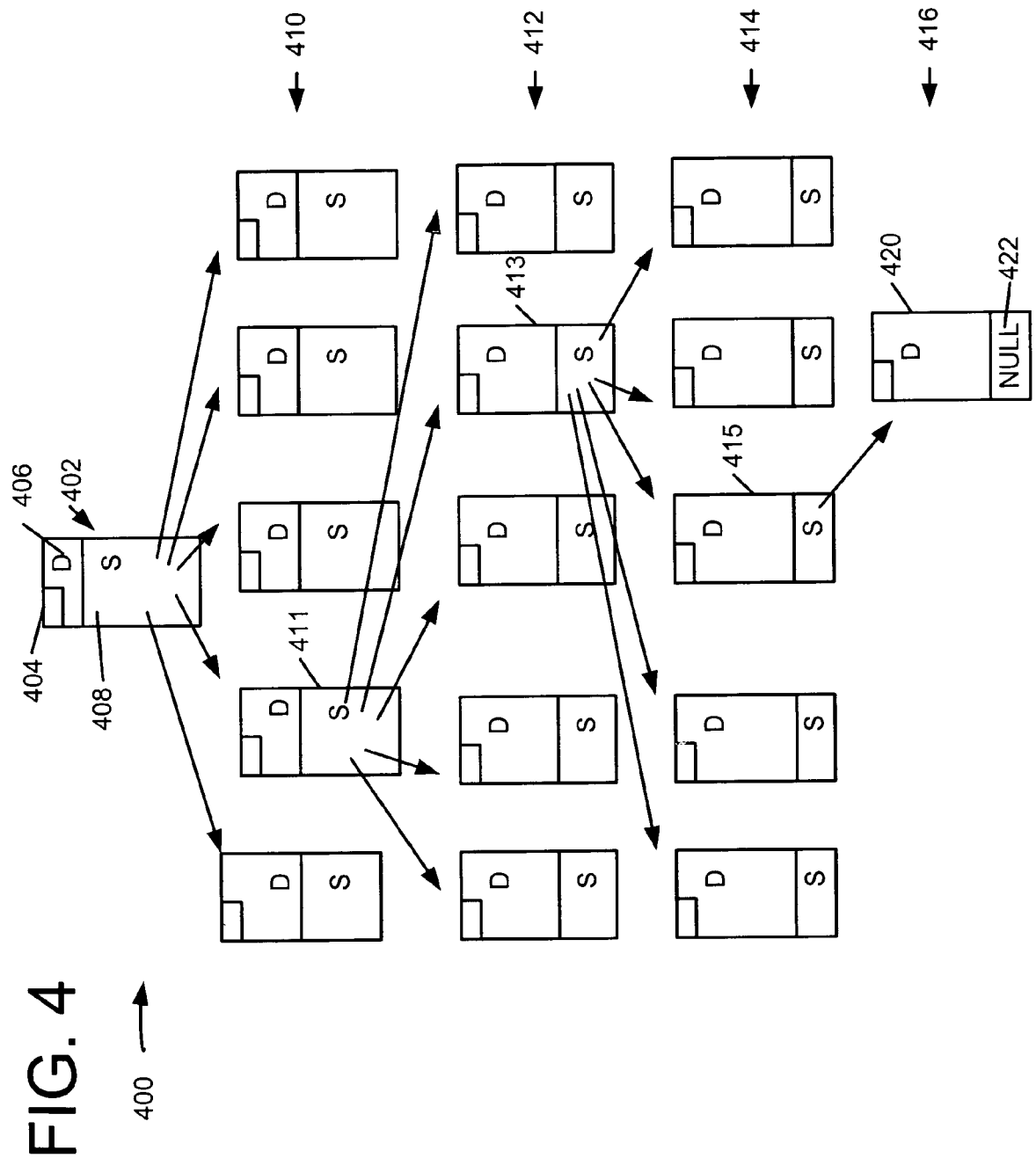
FIG. 4 is a block diagram of an illustrative example of a preferred embodiment of a hierarchical vulnerability database structure of a system for automated diagnosis of security and reliability problems for electronic profile or policy enabled systems.

FIG. 4 is a block diagram of an illustrative example of a preferred embodiment of a hierarchical vulnerability database structure (HVD structure) 400 of a system for automated diagnosis of security and reliability problems for electronic profile or policy enabled systems. The HVD structure 400 includes a plurality of database pages such as page 402. The database page 402 includes a page index 404, a data section 406 and a selector selection 408. The database pages 402 may also be referred to as entries or forms. The page index 404 preferably includes an index number and a descriptive title. In a preferred embodiment, the page index 404 is utilized by the HVD structure 400 to retrieve the appropriate database page 402.

The data section 406 includes the actual information and data accumulated and presented to the user regarding details of the identified vulnerability or reliability results. The selector section 408 in a preferred embodiment includes one or more independent lines of data, and up and down links to related database pages. In a preferred embodiment, the selector section 408 includes one or more index numbers as a database link to any related pages and a matching field which contains a list of keywords, associated numeric ranges, etc., all of which can be used in the matching process to select subsequent pages to access. Thus in a preferred embodiment, each independent line of the selector section contains one or more keywords plus one or more specific database page link indices with which these keywords are specifically associated (as well as optional data such as related numeric ranges for alternate or advanced matching/filtering). In an alternative embodiment, the selector section 408 includes an empty or "null" downward-pointing indicator line if the page is a "bottom page."

In the illustrative example shown in FIG. 4, a cycle typically begins at the top database page 402. In an example, the database page 402 contains mostly selector section information. The database pages at level 410 each include selector section 408 information, however, the amount of solution data in the data section 406 is increasing. At level 412, the database pages include less selector section 408 information and more solution data in the data section 406. At level 414, the database pages include more detailed solution data in the data section 406 and very little information in the selector section 408. Level 416 shows the bottom of the HVD structure 400 for the illustrative example. Database page 420 includes a null section 422 indicating that this page is the bottom page. The bottom database page 420 does not include a downward pointing selector information and thus, a cycle stops at this page unless the cycle was previously stopped.

As shown in FIG. 4, the database pages are preferably organized in a hierarchical structure. For example, a cycle or search typically begins at HVD page 402. The selector section 408 of this page 402 provides links to a number of related pages. In an example, only one page, for example, HVD page 411 contains relevant information. Another cycle based on keywords identified in HVD page 411 uncovers links to the next level of HVD pages with HVD page 413 providing relevant information. Another cycle based on keywords identified in HVD page 413 reveals a link to HVD page 415. Another cycle based on keywords identified in HVD page 415 reveals a link to HVD page 420. In this example, HVD page 420 is the bottom page, as indicated by the null 422 reference, and thus no downward pointing selector information is available and the cycle ends.

Figure 5B:
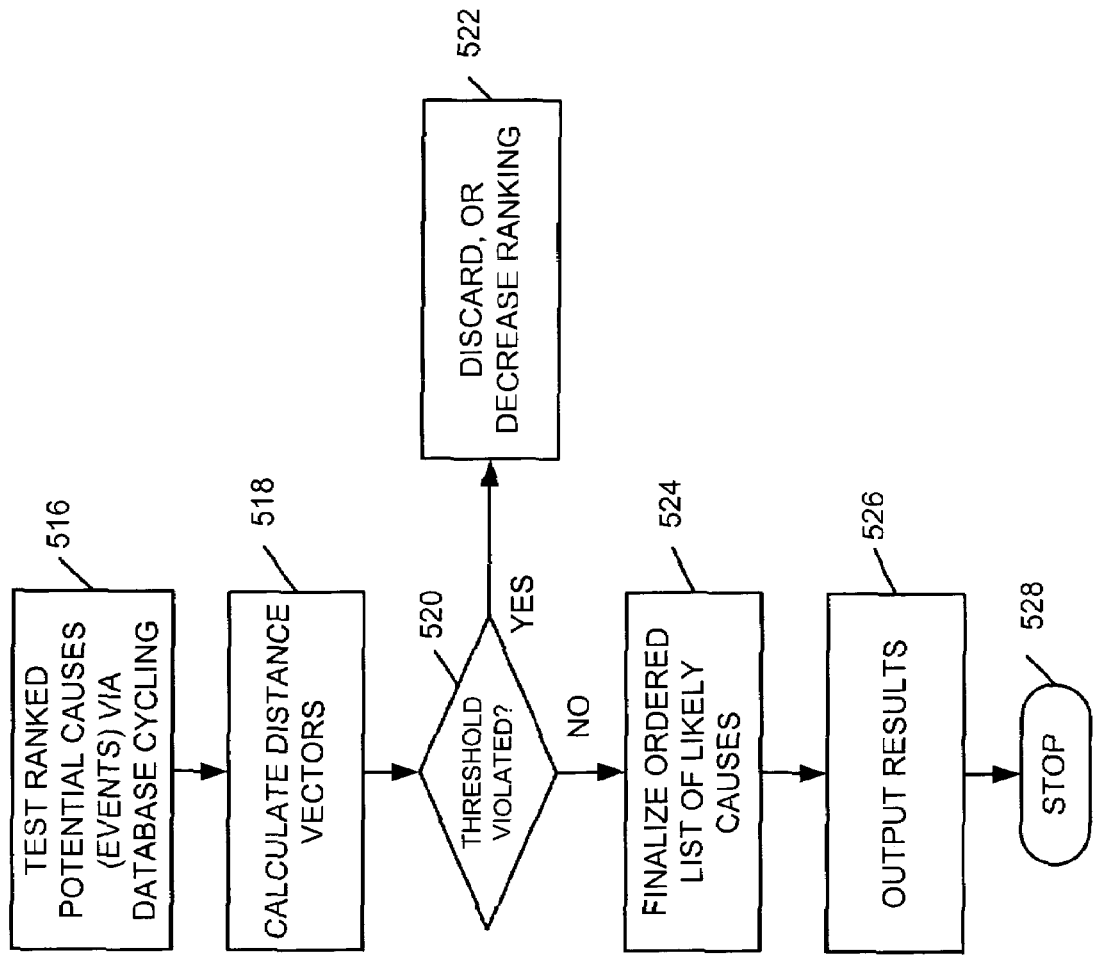

FIGS. 5A and 5B are flowcharts depicting functionality, in accordance with one preferred embodiment, of an implementation of an example of utilizing an automated diagnosis of security and reliability problems for electronic profile or policy enabled systems. Referring to FIG. 5A, the process begins at 502. In an example, a user has discovered that a server of a policy controlled system is found to have been recently compromised via a hacker attack. Key files for example administrative log files on the server of the system have been altered. Further, the hacker apparently added a new user account in order to facilitate further unauthorized use. At 504, problem input is obtained. In a preferred embodiment, the problem is input either by the user, administrator or automatically (e.g., by a management system). At 506, an adaptive logger is searched for potential related changes by consulting its log memory, in which time-stamped policy/configuration changes for the network/system are preferably stored as they occur (e.g., obtained via the network management system). In an example, the adaptive logger identifies three recent policy (i.e., configuration) changes that fall within the configurable parameter limits. The first change is on the server, and is essentially a software application/package upgrade that happens to include an old version of a secure shell software (SSH). For instance, in some typical cases or examples software upgrades include some components that are older (rather than newer) than a component already installed. The second change identified is also on the server but is a minor change to a graphical user interface (GUI). The third change is to an adjacent router, but is also minor.

At 508, the three potential causes are ranked in a preliminary fashion. All three changes are potential causes of the problem that require verification to determine if any of them could be actual causes of the problem. The first and second changes are highest ranked because they are on the server itself. The second change is ranked slightly higher than the first change since it occurred only two days prior to the time the problem was noted, in contrast to the first change that occurred a week prior. The third change is lower ranked because it occurred two weeks earlier and is located on an element a hop away, rather than being on the same element as the problem. In addition, the third change is on a router, which via the configurable rank adjustment rules is identified as less security sensitive (in cases of security problems noted on a server).

At 510, if the problem description is completed by a problem accumulator module, then at 512, parameters of the adaptive logger are modified as needed. If the problem description is not finished, then the problem input process continues at 504. At 514, recording focus and detail are adjusted (e.g., in this example, the adaptive logger will begin to log/record policy/configuration changes that occur on servers and routers with greater detail, at least for a configurable temporary time period). The process continues on FIG. 5B.

Referring to FIG. 5B, at 516, the ranked potential causes are tested utilizing database cycling in order to verify that they may be actual causes of the problem. In a preferred embodiment, the potential causes are verified by utilizing information contained in the EDD 210 and HVD 212 and a process as described in U.S. Pat. No. 7,237,266, entitled "Electronic Vulnerability and Reliability Assessment." At 518, the distances are calculated. At 520, a determination is made by a distance estimator module as to whether or not threshold levels set by the user or administrator are violated. If yes, at 522, the rankings in violation are discarded or decreased. In some embodiments, potential causes can be discarded using a configurable distance threshold set by the user such that any possible causes with distances that exceed this threshold value are deemed exceedingly unlikely to be actual causes, and therefore can be eliminated and subsequently ignored. In this example, the verification process verifies only the first and second potential causes. The third potential cause is discarded since it is determined to not be able to cause any vulnerability corresponding to the noted problem, and thus is not verified. The second change results in a very large verification distance, which subtracts greatly from its ranking, although it is not large enough to cause it to be discarded (i.e., its distance does not exceed the configurable threshold). The first change has a very small verification distance, which negligibly subtracts from its high ranking. If the threshold is not violated for one or more potential causes, at 524, a finalized ordered list of likely causes is prepared. For example, utilizing information from the EDD 210, preliminary rankings are adjusted to form the final rankings (e.g., final distances).

At 526, results are output and presented to a user or administrator. In an example, the final set of potential causes is presented as a smaller set of possible causes with an appropriate ordered format (e.g., most likely to least likely cause or contributor to the problem). In an alternative embodiment, probabilities that the possible causes are the true causes can be calculated from the final distances and presented to user (e.g., when reference point probability-distance pair can be determined). In an example, the user examining the output for the problem under examination observes that the software upgrade included a specific old version of SSH, which has known vulnerabilities that allow a hacker to obtain full access to the server on which it is installed. The vulnerability has been exploited widely. Therefore, this change is the likely true cause of the problem and should be corrected by replacing the older vulnerable SSH version with the newest SSH version available (which has been patched such that it is no longer vulnerable to this exploit). Based on the output information, the user chooses to end the examination, and the process ends at 528.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for providing automated diagnosis of problems for a computer network, comprising:

receiving input regarding a problem with the computer network;

identifying configuration changes made to components of the computer network that are associated with parameters of the problem;

associating each of the identified configuration changes with a rank based on a likelihood that each of the identified configuration changes caused the problem, the rank determined based on a proximity of each of the configuration changes to the problem, a difference in time between an occurrence of each of the configuration changes and an occurrence of the problem, and a security sensitivity associated with the components of the computer network; and verifying that the ranked configuration changes are related to the problem.

2. The method of claim 1, further comprising:

formulating a list of the configuration changes based on or ordered in terms of the rank associated with each of the verified configuration changes; and presenting the list to a user.

3. The method of claim 1, further comprising:

determining a distance between each of the configuration changes and the problem;

comparing the determined distance associated with each of the verified configuration changes with a configurable distance threshold; and discarding any of the verified configuration changes associated with the determined distance that violates the configurable distance threshold.

4. The method of claim 1, further comprising:
   recording the configuration changes made to the computer network at a first level of detail; and
   in response to receiving the input regarding the problem, recording the configuration changes associated with the problem at a second level of detail, wherein the second level of detail is greater than the first level of detail.

5. The method of claim 1, further comprising accumulating and filtering the received input associated with the problem until all of the input is received.

6. The method of claim 1, further comprising searching a database having user records, vulnerability and reliability data to verify the ranked configuration changes.

7. The method of claim 1, wherein the parameters of the problem include at least one of a component of the computer network experiencing the problem, a component of the computer network affected by the problem, and a time at which the problem was first noted.

8. The method of claim 1, wherein verifying that the ranked configuration changes are related to the problem includes cycling through a database structure configured as hierarchical database pages, each of the database pages having a page index, data section and selector section, wherein the data section includes reliability information associated with the components of the computer network associated with the problem to verify that the ranked configuration changes are related to the problem, and wherein the selector section includes links to other related database pages of the database structure for cycling through the database structure.

9. A computer-readable medium executable on a computer having a program for providing automated diagnosis of problems for a computer network, comprising:
   logic configured to receive input regarding a problem with the computer network;
   logic configured to identify configuration changes made to components of the computer network that are associated with parameters of the problem;
   logic configured to associate each of the identified configuration changes with a rank based on a likelihood that each of the identified configuration changes caused the problem, the rank determined based on a proximity of each of the configuration changes to the problem, a difference in time between an occurrence of each of the configuration changes and an occurrence of the problem, and a security sensitivity associated with the components of the computer network; and
   logic configured to verify that the ranked configuration changes are related to the problem.

10. The computer-readable medium of claim 9, further comprising:
    logic configured to formulate a list of the configuration changes based on the rank associated with each of the verified configuration changes; and
    logic configured to present the list to a user.

11. The computer-readable medium of claim 9, further comprising:
    logic configured to record the configuration changes made to the computer network at a first level of detail; and
    logic configured to record the configuration changes associated with the problem at a second level of detail in response to receiving the input regarding the problem, wherein the second level of detail is greater than the first level of detail.

12. The computer-readable medium of claim 9, further comprising logic configured to accumulate and filter the received input associated with the problem until all of the input is received.

13. The computer-readable medium of claim 9, further comprising logic configured to search a database having user records, vulnerability and reliability data to verify the ranked configuration changes.

14. The computer-readable medium of claim 9, wherein the parameters of the problem include at least one of a component of the computer network experiencing the problem, a component of the computer network affected by the problem, and a time at which the problem was first noted.

15. A system for providing automated diagnosis of problems for a computer network, comprising:
    means operative to receive input regarding a problem with the computer network;
    means operative to identify configuration changes made to components of the computer network that are associated with parameters of the problem;
    means operative to associate each of the identified configuration changes with a rank based on a likelihood that each of the identified configuration changes caused the problem, the rank determined based on a proximity of each of the configuration changes to the problem, a difference in time between an occurrence of each of the configuration changes and an occurrence of the problem, and a security sensitivity associated with the components of the computer network; and
    means operative to verify that the ranked configuration changes are related to the problem.

16. The system of claim 15, further comprising means operative to receive policy or profile input from a user's processing device or policy-management systems and to convert the policy or profile input into usable data.

17. The system of claim 15, wherein the means operative to verify that the ranked configuration changes are related to the problem include:
    a database populated with descriptive system information; and
    a database structure configured as hierarchical database pages, each database page having a page index, data section and selector section, wherein the data section is further configured to include reliability or vulnerability information associated with the components of the computer network associated with the problem to verify that the ranked configuration changes are related to the problem, and wherein the selector section is further configured to include links to other related database pages of the database structure.

18. The system of claim 17, further comprising means operative to enable provisioning and access to the database and the database structure.

19. The system of claim 17, wherein the database comprises an element descriptive database (EDD).

20. The system of claim 17, wherein the database structure comprises a hierarchical vulnerability database (HVD) structure.

21. The system of claim 15, further comprising means operative to accumulate and filter the received input regarding the problem with the computer network until all of the input is received.

22. The system of claim 15, wherein the parameters of the problem include at least one of a component of the computer network experiencing the problem, a component of the computer network affected by the problem, and a time at which the problem was first noted.

23. The system of claim 15, further comprising:

means operative to formulate a list of the configuration changes based on the rank associated with each of the verified configuration changes; and means operative to present the list to a user.

24. The system of claim 15, further comprising:

means operative to record the configuration changes made to the computer network at a first level of detail; and means operative to record the configuration changes associated with the problem at a second level of detail in response to receiving the input regarding the problem, wherein the second level of detail is greater than the first level of detail.

* * * * *